(12) United States Patent
Chun et al.

(10) Patent No.: US 8,896,889 B2
(45) Date of Patent: Nov. 25, 2014

(54) DOCUMENT SCANNING APPARATUS AND IMAGE FORMING APPARATUS HAVING THE SAME

(75) Inventors: Jee-hoon Chun, Seongnam-si (KR); Gyu-sok Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 94 days.

(21) Appl. No.: 13/137,586

(22) Filed: Aug. 26, 2011

(65) Prior Publication Data

US 2012/0133995 A1    May 31, 2012

(30) Foreign Application Priority Data

Nov. 29, 2010    (KR) .................. 10-2010-0120003

(51) Int. Cl.

| | | |
|---|---|---|
| *H04N 1/04* | (2006.01) | |
| *H04N 1/031* | (2006.01) | |
| *H04N 1/12* | (2006.01) | |
| *H04N 1/203* | (2006.01) | |
| *H04N 1/407* | (2006.01) | |

(52) U.S. Cl.
CPC ........... *H04N 1/0318* (2013.01); *H04N 1/1235* (2013.01); *H04N 1/2032* (2013.01); *H04N 1/407* (2013.01); *H04N 2201/044* (2013.01)
USPC .......................................... 358/474; 358/498

(58) Field of Classification Search
CPC ..... H04N 1/04; H04N 1/0402; H04N 1/0461; H04N 1/23
See application file for complete search history.

(56) References Cited

U.S. PATENT DOCUMENTS

| | | | |
|---|---|---|---|
| 6,963,367 B1 * | 11/2005 | Hashimoto ................... | 348/241 |
| 2007/0223061 A1 * | 9/2007 | Tanaka et al. ................. | 358/497 |
| 2008/0266614 A1 * | 10/2008 | Doan et al. .................... | 358/474 |
| 2008/0291512 A1 * | 11/2008 | Su et al. ........................ | 358/498 |
| 2010/0245950 A1 * | 9/2010 | Osakabe ....................... | 358/498 |

* cited by examiner

*Primary Examiner* — Fred Guillermety
*Assistant Examiner* — Henok A Shiferaw
(74) *Attorney, Agent, or Firm* — Staas & Halsey LLP (57) ABSTRACT

A document scanning apparatus for scanning a document is provided. The document scanning apparatus includes an image sensor unit which irradiates an incident light towards the document and generates image data by sensing a reflected light reflected from the document, a supporting unit which supports the image sensor unit, a movement unit which moves the image sensor unit between a scanning position and a calibration position, a housing which houses the image sensor unit, the supporting unit, and the movement unit, a transparent plate which transmits the incident light and the reflected light, a calibration sheet which is attached to a surface of the transparent plate, which is exposed to outside and is positioned in an area including the calibration position, and a housing cover which is coupled to the housing and seals inside of the housing.

20 Claims, 13 Drawing Sheets

DOCUMENT SCANNING APPARATUS AND IMAGE FORMING APPARATUS HAVING THE SAME

CROSS-REFERENCE TO RELATED APPLICATIONS

This application claims priority benefit from Korean Patent Application No. 2010-0120003, filed in the Korean Intellectual Property Office on Nov. 29, 2010, the disclosure of which is incorporated herein by reference.

BACKGROUND

1. Field

Aspects of embodiments relate to a document scanning apparatus, and more particularly, to a document scanning apparatus which is mountable on an Automatic Document Feeder (ADF).

2. Description of the Related Art

In general, an image forming apparatus such as a copier and a multi-function printer (MFP) includes a scanning apparatus to copy a document. An ADF is an apparatus which provides a plurality of documents to a scanning apparatus sheet by sheet, thereby increasing user convenience.

Recently, a function of a duplex scanning which allows scanning of a sheet of paper on both sides simultaneously is provided to an image forming apparatus. The duplex scanning may be performed by using one document scanning apparatus or two document scanning apparatuses. The duplex scanning using two document scanning apparatuses is referred to as single pass duplex scanning, and performs scanning of each side of a document using two document scanning apparatuses while the document is being transferred. If one document scanning apparatus is used, a reverse path is required to reverse a document. However, such a reverse path is not required in the single pass duplex scanning method. Accordingly, it is more advantageous to use the single pass duplex scanning method to perform high-speed scanning.

In an image forming apparatus using the single pass duplex scanning method, one document scanning apparatus is generally placed below a platen and the other document scanning apparatus is placed on an ADF. Since the document scanning apparatus placed on an ADF is exposed to outside, it may be exposed to contaminants (such as, dust in the air or small paper dust occurring while a document is being transferred). If such contaminants are attached to the document scanning apparatus, it may deteriorate copy quality. Therefore, a technology to prevent contamination of a document scanning apparatus is required.

A document scanning apparatus has its life span and thus, after a certain period of time, the document scanning apparatus should be replaced. However, it is quite onerous for a user to replace a document scanning apparatus in person, so the user generally uses after-sales service to replace a document scanning apparatus. Therefore, a technology to make it easier to replace a document scanning apparatus is required.

SUMMARY

In an aspect of one or more embodiments, there is provided a document scanning apparatus for scanning a document including an image sensor unit which irradiates an incident light towards the document and generates image data by sensing a reflected light reflected from the document, a supporting unit which supports the image sensor unit, a movement unit which moves the image sensor unit between a scanning position and a calibration position, a housing which houses the image sensor unit, the supporting unit, and the movement unit, a transparent plate which transmits the incident light and the reflected light, a calibration sheet which is attached to a surface of the transparent plate which is exposed to outside, the calibration sheet being positioned in an area including the calibration position, and a housing cover which is coupled to the housing and seals inside of the housing.

The image sensor unit may move between the scanning position and the calibration position while contacting the transparent plate.

The apparatus may further include an elastic element which presses the image sensor unit towards the transparent plate.

The elastic element may include at least one spring one end of which is connected to the supporting unit and the other end of which is connected to the image sensor unit.

The transparent plate may be formed on the housing cover.

The movement unit may include a motor which provides driving power and a power transmission apparatus which transmits driving power provided by the motor to the supporting unit supporting the image sensor unit.

The power transmission apparatus may include a worm which is formed on a rotation axis of the motor, a worm wheel which is interlinked with the worm, and a rack which is interlinked with the worm wheel and is formed on the supporting unit.

The housing may include a guide shaft for guiding movement of the image sensor unit, and the supporting unit may include a guide holder movably interlinked with the guide shaft.

The motor may be disposed on one end of the housing and the guide shaft may be disposed on the other end of the housing.

The apparatus may further include a transparent sheet which is attached on the surface of the transparent plate and is positioned in an area including the scanning position.

A thickness of the calibration sheet may be the same as a thickness of the transparent sheet.

The calibration sheet may be disposed in upstream of the transparent sheet with reference to a transfer direction of the document, and a thickness of the calibration sheet may be thicker than a thickness of the transparent sheet.

The transparent sheet may be disposed in upstream of the calibration sheet with reference to a transfer direction of the document, and a thickness of the transparent sheet may be thicker than a thickness of the calibration sheet.

The apparatus may further include a protection film which is attached on the calibration sheet to protect the calibration sheet.

A coefficient of friction of the protection film may be lower than a coefficient of friction of the calibration sheet.

In an aspect of one or more embodiments, there is provided an image forming apparatus including an automatic document feeder (ADF) which transfers a document along a transfer path, a first document scanning apparatus which scans one side of the document being transferred along the transfer path, a second document scanning apparatus which scans the other side of the document being transferred along the transfer path, and an image forming unit which forms an image on a printing medium according to image data received from the first and the second scanning apparatuses.

The second scanning apparatus may be detachably mounted on the ADF.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Certain embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

Figure 1:
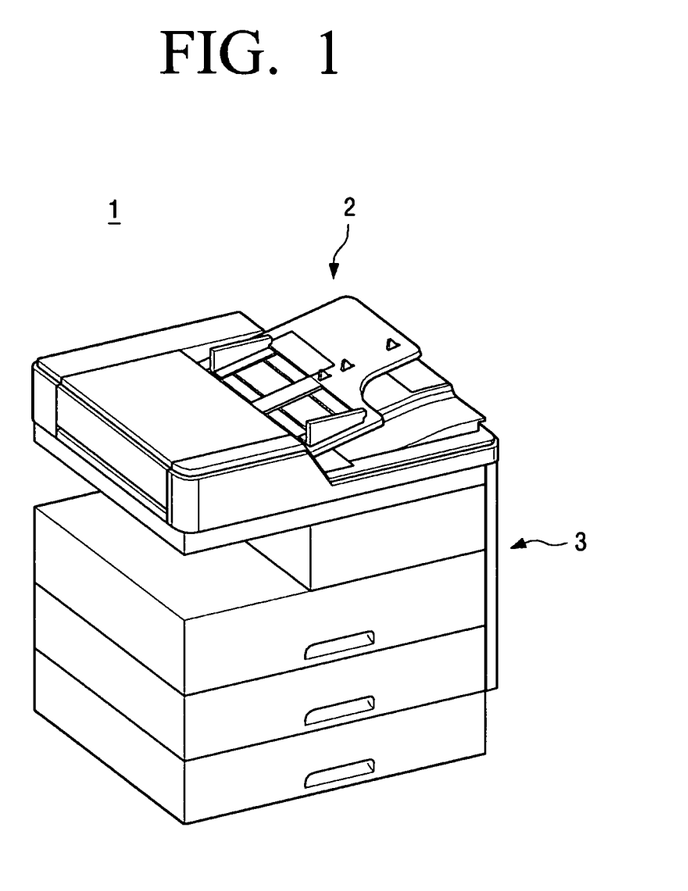
FIG. 1 is a perspective view illustrating an image forming apparatus briefly according to an embodiment.

FIG. 1 is a perspective view illustrating an image forming apparatus (1) briefly according to an embodiment. The image forming apparatus (1) may be a copier or an MFP which may copy a document and includes a scanning module (2) and a printing module (3). The scanning module (2) scans a document and generates image data, and the printing module (3) receives image data from the scanning module (2) and forms an image on a printing medium. The scanning module (2) may be referred to as an Image Input Terminal (IIT) and the printing module (3) may be referred to as an Image Output Terminal (IOT).

Figure 2:
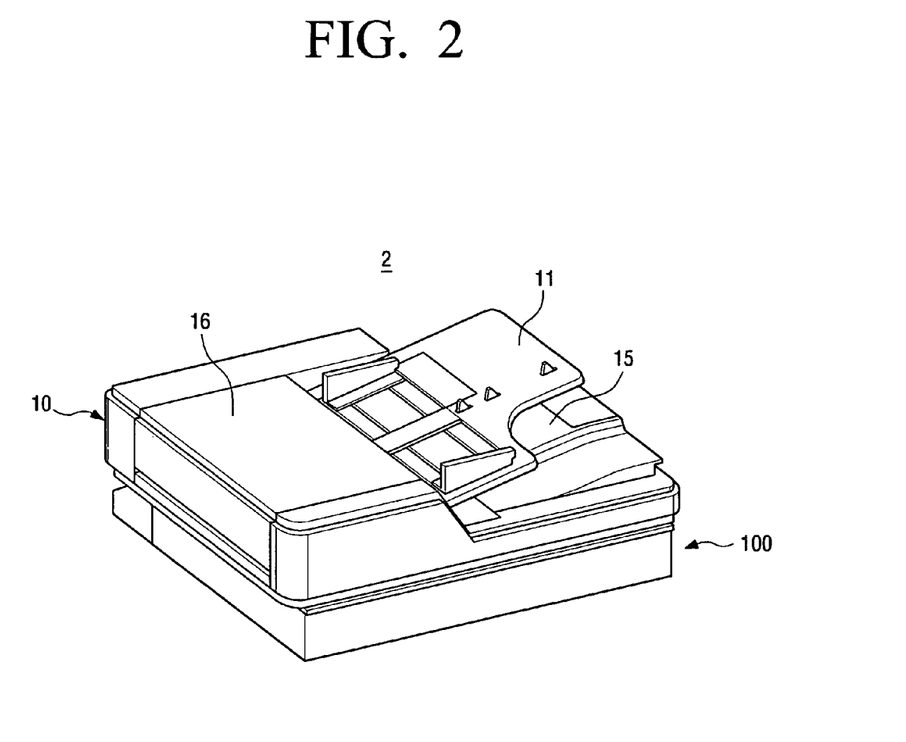
FIG. 2 is a perspective view illustrating a scanning module briefly.
Figure 3:
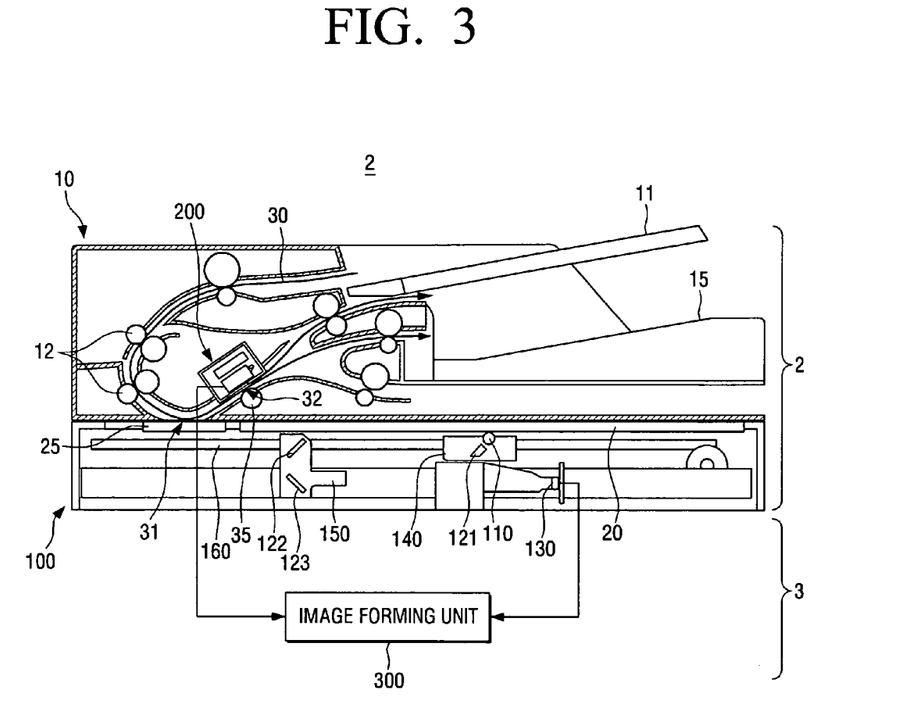
FIG. 3 is a sectional view illustrating a scanning module briefly.
Figure 4:
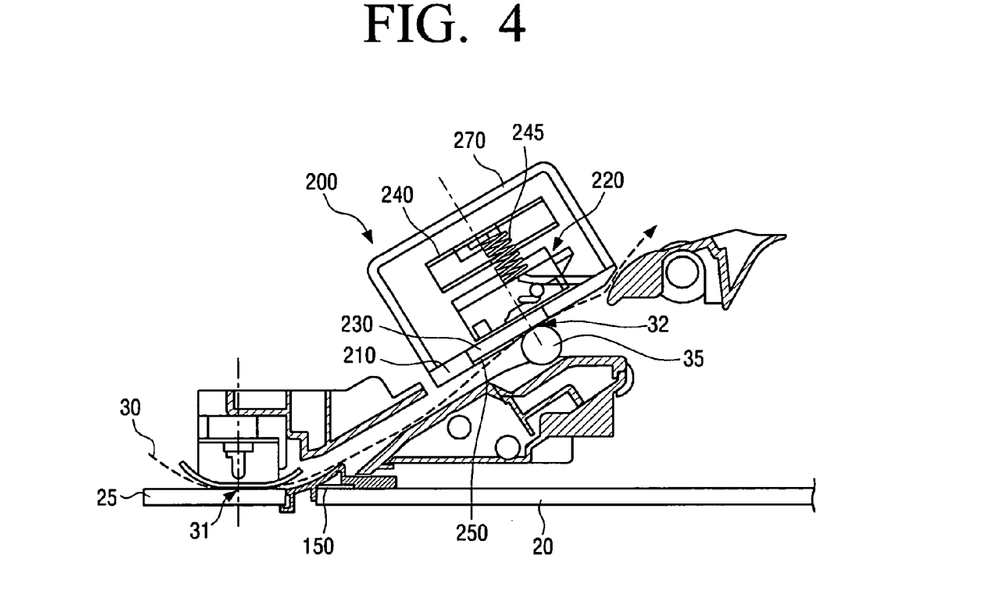
FIG. 4 is a view in which part of FIG. 3 is enlarged.

FIG. 2 is a perspective view illustrating the scanning module (2) briefly, FIG. 3 is a sectional view illustrating the scanning module (2) briefly, and FIG. 4 is a view in which part of FIG. 3 is enlarged.

As illustrated in FIGS. 2 to 3, the scanning module (2) according to an embodiment may comprise an Automatic Document Feeder (ADF; 10), a first document scanning apparatus 100, and a second document scanning apparatus 200.

A user may copy a document automatically using the ADF 10 or may copy a document manually without using the ADF 10. First of all, copying a document manually by a user will be explained, and then copying a document automatically by a user will be explained.

FIGS. 2 to 4 illustrates that a main platen 20 is blocked by the ADF 10. However, the ADF 10 may be lifted so that the main platen 20 is exposed. If a user copies a piece of document or a book manually without using the ADF 10, the user lifts the ADF 10 and a document or a book to be copied on the main platen 20. Subsequently, the first document scanning apparatus may scan the document or the book on the main platen 20.

The first document scanning apparatus 100 may comprise a light source 110, a first to a third mirrors 121-123, and an image sensor 130. The light source 110 and the first mirror 121 are supported by a light source carrier 140, and the second to the third mirrors are supported by a mirror carrier 150. The light source carrier 140 and the mirror carrier 150 may move along a guide rail 160 by a driving means which is not illustrated. While the light source carrier moves along the guide rail 160, the light source 110 irradiates a light towards the main platen 20. The light irradiated from the light source is reflected upon the document placed on the main platen 20. The reflected light which is reflected from the document on the main platen 20 moves towards the image sensor 130 through the first to the third mirrors 121-123. The image sensor 130 generates predetermined image data from the reflected light and such image data is transmitted to an image forming unit in the printing module (3).

The image forming unit 300 forms an image on a printing medium according to image data received from the first document scanning apparatus 100. For example, the image forming unit 300 may use an electronic photographing method. In the electronic photographing method, a charging process, a laser scanning process, developing process, a transferring process, and a fusing process are performed to form an image on a printing medium. The detailed configuration of the image forming unit 300 may be easily understood by those skilled in the related art and thus, further explanation will not be provided.

Next, copying a document automatically using the ADF 10 will be explained.

As illustrated in FIGS. 2 to 4, a user places the ADF 10 on the first document scanning apparatus 100 and a document to be printed on a first tray 11. The ADF 10 transfers the document on the first tray 11 along a transfer path 30 using a plurality of rollers 12. The document passes a first scanning point 31 and a second scanning point 32 which is in downstream of the first scanning point 31.

The first document scanning apparatus 100 generates predetermined print data by scanning one side of a document transferred along the transfer path 30 in the first scanning point 31. In this case, it should be noted that the light source 110 of the first document scanning apparatus 100 is positioned in the first scanning point 31. That is, in FIG. 3, the light source carrier 140 and the mirror carrier 150 move in the left so that the light source 110 may be positioned in the first scanning point 31. The first scanning point 31 is disposed in an auxiliary platen 25. The light source irradiates a light towards the auxiliary platen 25. The light irradiated from the light source 110 is reflected from a document passing the first scanning point 31. The reflected light which is reflected from the document passing the first scanning point 31 moves towards the image sensor 130 through the first to the third mirrors 121-123. The image sensor 130 generates predetermined image data from the reflected light.

The second document scanning apparatus 200 generates predetermined image data by scanning the other side of a document transferred along the transfer path 30 in the second scanning point 32. The second document scanning apparatus 200 will be explained in detail later.

The document passed the transfer path 20 is stacked on a second tray 15. The image data generated by the first and the second document scanning apparatuses 100, 200 is transmitted to the image forming unit 300 in the printing module 3, and the image forming unit 300 forms an image on a printing medium according to the image data received from the first and the second document scanning apparatuses 100, 200. As such, the single passes duplex scanning method using two document scanning apparatuses 100, 200 is applied to the scanning module 2 according to an embodiment.

Hereinafter, the second document scanning apparatus 200 will be explained in detail with reference to FIGS. 4 to 11.

Figure 5:
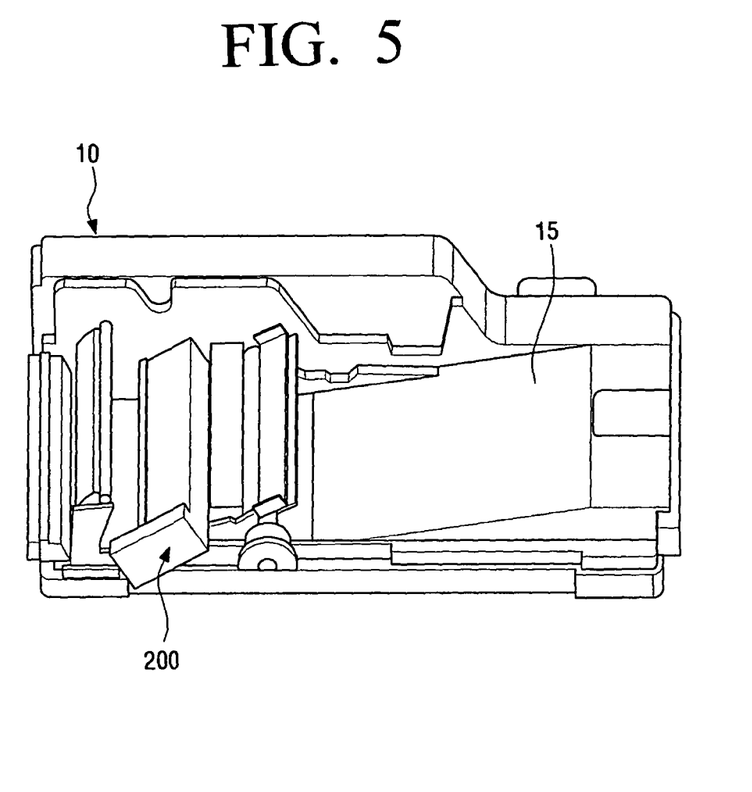
FIG. 5 is a schematic view illustrating that an ADF cover is removed.
Figure 6:
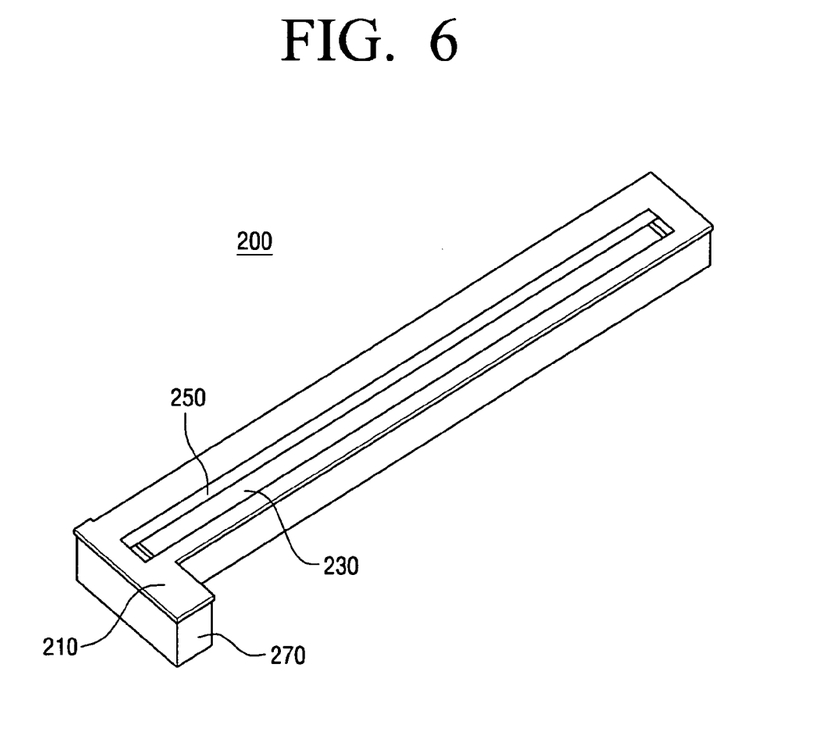
FIG. 6 is a perspective view illustrating a second document scanning apparatus briefly.
Figure 7:
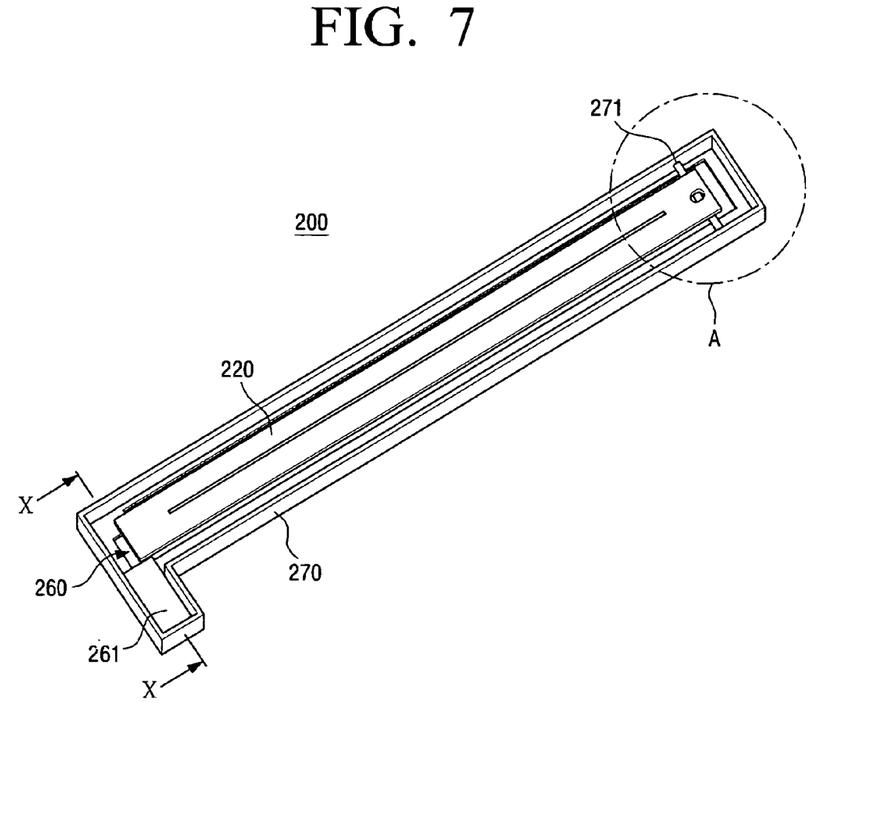
FIG. 7 is a perspective view illustrating a second document scanning apparatus without a housing cover briefly.

FIG. 5 is a schematic view illustrating that an ADF cover 16 is removed, FIG. 6 is a perspective view illustrating the second document scanning apparatus 200 briefly, and FIG. 7 is a perspective view illustrating the second document scanning apparatus 200 without a housing cover 210 briefly.

An image sensor unit 220 irradiates an incident light towards a document passing the second scanning point 32 and generates image data by sensing a light reflected from the document (see FIGS. 4 and 7). The image sensor unit 220 includes a light source, a lens, and an image sensor. The image sensor unit 220 may be a contact image sensor. The image sensor unit 220 has an elongated shape so as to scan a paper.

A transparent plate 230 is made of material which may transmit a light. The incident light irradiated from the image sensor unit 220 and the reflected light reflected from a document may transmit the transparent plate 230. In an embodiment, the transparent plate 230 is formed in the housing cover 210.

As illustrated in FIG. 4, a roller 35 is disposed in a location adjacent to the transparent plate 230. A paper moving towards the second scanning point 32 passes the second scanning point 32 while contacting the transparent plate 230 by the roller 35. Accordingly, the paper of the image sensor unit 220 may be scanned accurately.

A supporting unit 240 supports the image sensor unit 220. The supporting unit 240 may be embodied in various shapes as long as the supporting unit 240 supports the image sensor unit 220.

An elastic element 245 presses the image sensor unit 220 towards the transparent plate 230. For example, one end of the elastic element 245 may be a spring one end of which is connected to the support unit 240 and the other end of which is connected to the image sensor unit 220. Only one spring is illustrated in FIG. 4, but a plurality of springs may be disposed longwise of the image sensor unit 220. The image sensor unit 220 may tightly contact a transparent plate by the elastic element 245 and thus, be able to scan a document passing the second scanning point 32 accurately.

In an embodiment, the image sensor unit 220 and the support unit 240 are explained as separately elements from each other, but the image sensor unit 220 and the supporting unit 240 may be integrally formed.

A calibration sheet 250 is attached to a surface 231 (see FIGS. 8 and 9) of the transparent plate 230, which is exposed to outside. For example, the calibration sheet 250 may be attached to the transparent plate 230 using a double side tape. However, the calibration sheet 250 may be attached to the transparent plate 230 using other various methods.

The operation of calibrating image data generated the image sensor unit 220 is referred to as calibration which is performed to generate image data which reflects an image in a document more accurately. Even through the same document is scanned, image data generated by the image sensor unit 220 may differ depending on a surrounding environment or a state of the image sensor unit 220. One of the reasons for such a difference is because characteristics of a light coming out of a light source in the image sensor unit 220 change as the light source is used for a prolonged period of time. As characteristics of a light coming out of a light source changes, image data generated by the image sensor unit 220 also changes.

In order to calibrate image data, reference image data based on which calibration is performed is required and the reference image data may be obtained using the calibration sheet 250. It is desirable to make the calibration sheet 250 using material which is not discolored easily in order to calibrate image data accurately. For example, the calibration sheet 250 may be made of FB-200 by YUPO, a Japanese manufacturer.

The method for calibrating image data will be explained in greater detail.

Figure 8:
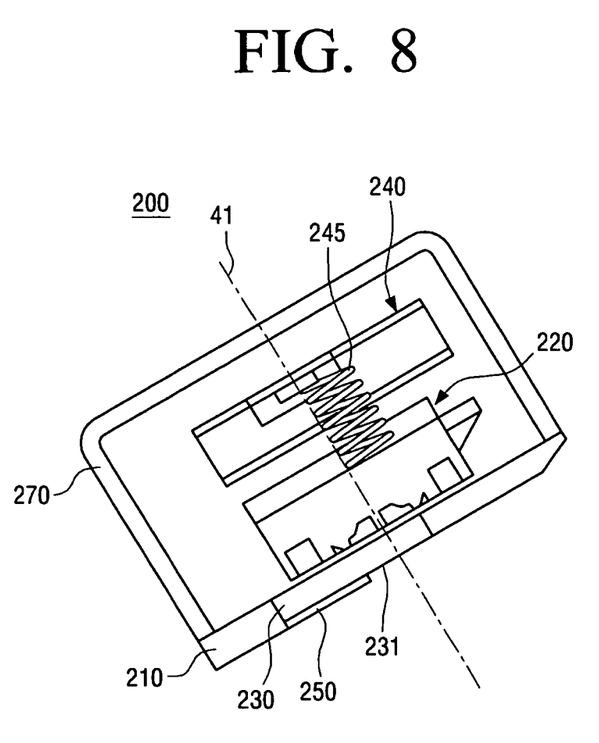
FIG. 8 is a view illustrating that an image sensor unit is located in a scanning position where document scanning is performed.
Figure 9:
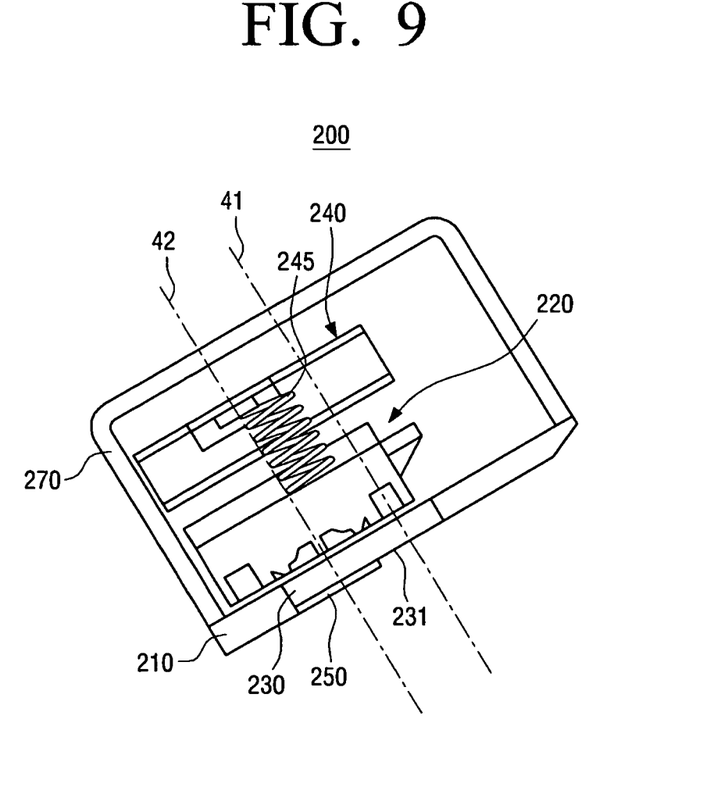
FIG. 9 is a view illustrating that an image sensor unit is located in a calibration position to obtain reference image data.

FIG. 8 is a view illustrating that the image sensor 220 is located in a scanning position 41 where document scanning is performed, and FIG. 9 is a view illustrating that the image sensor unit 220 is located in a calibration position 42 to obtain reference image data.

As illustrated in FIG. 9, the calibration sheet 250 is located in an area including the calibration position 42. If the image sensor unit 220 is located in the calibration position 42, the image sensor unit 220 irradiates an incident light towards the calibration sheet 250 and generates image data by sensing a light reflected from the calibration sheet 250. In this case, the image data becomes reference image data. Since most of documents are white, it is desirable that the calibration sheet 250 is white.

After reference image data is obtained, the image sensor unit 220 moves to the scanning position 41 to scan a document as illustrated in FIG. 8. The image data obtained through scanning a document is compared with reference image data and calibrated appropriately. The detailed process of calibrating image data may be easily understood by those skilled in the related art and thus, will not be explained further.

A calibration operation may not be performed every time a document is scanned but at a predetermined period. For example, a calibration operation may be performed before a printing job is performed.

In this case, it should be noted that a position from which a light coming out of the image sensor unit 220 is reflected—that is, a surface 231 of the transparent plate 230, which is exposed to outside—is the same whether the image sensor unit 220 is located in the scanning position 41 or in the calibration position 42. In other words, the optical distance sensed by the image sensor unit 220 is the same when the image sensor unit 220 is performing a scanning operation and when the image sensor unit 220 is performing a calibration operation. Therefore, both image data and reference image data are obtained in the same optical environment and thus, image data may be calibrated accurately.

In addition, since the calibration sheet 250 is tightly attached to the transparent plate 230, one side of the calibration sheet 250 from which a light is reflected during a calibration operation—that is, a surface contacting the transparent plate 230—may be prevented from being contaminated and thus, making it possible to calibrate image data accurately.

In FIGS. 8 and 9, the calibration position 42 is in upstream of the scanning position 42 with reference to a transfer direction of a document. However, the calibration position 42 may be in downstream of the scanning position 41 with reference to a transfer direction of a document.

In the above an embodiment, only the calibration operation of the second document scanning apparatus 200 is explained. Referring to FIG. 4, another calibration sheet 150 is provided to perform a calibration operation of the first document scanning apparatus 100. The calibration operation of the first document scanning apparatus 100 is similar to the operation explained above and thus, further explanation will not be provided.

Figure 10:
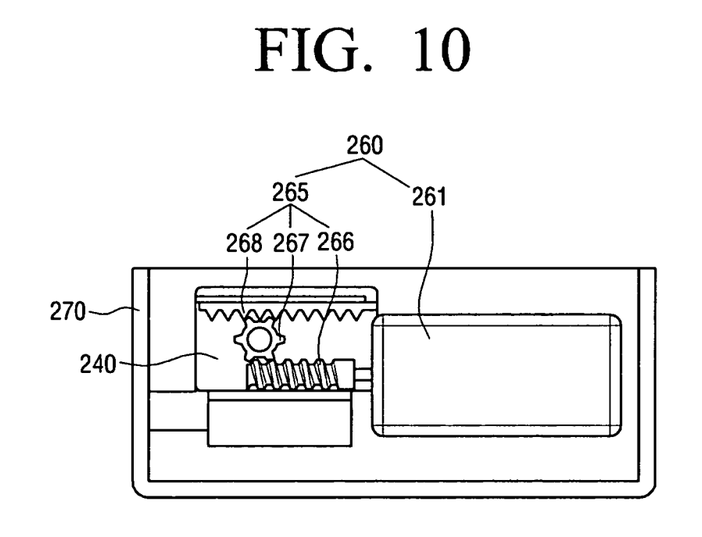
FIG. 10 is a sectional view illustrating FIG. 7 with respect to X-X line briefly.

As illustrated in FIGS. 8 and 9, the image sensor unit 220 is moved by a movement unit 260. Hereinafter, the movement unit 260 will be explained in detail with reference to FIG. 10. FIG. 10. is a sectional view illustrating FIG. 7 with respect to X-X line briefly.

The movement unit 260 moves the image sensor unit 220 between the scanning position 41 and the calibration position 42. The movement unit 260 may include a motor 261 and a power transmission apparatus 265.

The motor 261 provides driving power for moving the image sensor unit 220. If the second document scanning apparatus 200 is mounted on the ADF 10, power of the image forming apparatus (1) may be electrically connected to the motor 261 through a connector which is not illustrated. Accordingly, power required to operate the motor 261 may be provided to the motor 261.

The power transmission apparatus 265 transmits driving power provided by the motor 261 to the supporting unit 240 which supports the image sensor unit 220.

As illustrated in FIG. 10, the power transmission apparatus 265 may include a worm 266, a worm wheel 267, and a rack 268. The worm 266 is formed on a rotation axis of the motor 261, the worm wheel 267 is interlinked with the worm 266 and the rack 268, and the rack 268 is formed on the supporting unit 240. As the rotation axis of the motor 261 rotates, the supporting unit 240 may move by the worm 266, the worm wheel 267 and the rack which are interlinked with each other and thus, the image sensor unit 220 may also move. However, such a power transmission apparatus 265 is only an example, and the power transmission apparatus 265 may be modified and operated in various forms.

Figure 11:
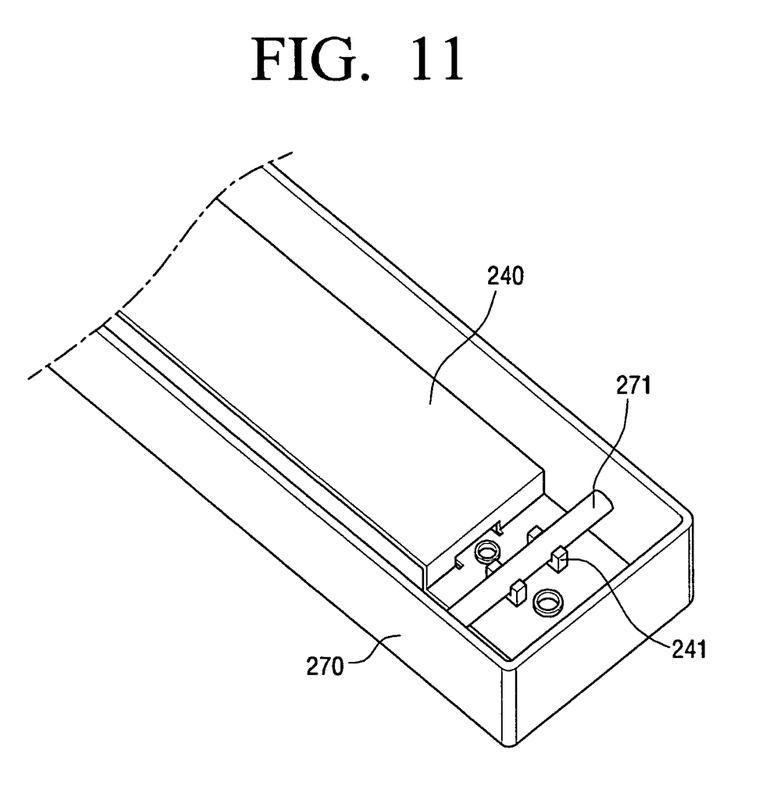
FIG. 11 is a view in which area A in FIG. 7 is enlarged.

FIG. 11 is a view in which area A in FIG. 7 is enlarged, but the image sensor unit 220 of FIG. 7 is omitted in FIG. 11.

As illustrated in FIG. 7, the motor 261 is disposed on one end of a housing 270 and a guide shaft 271 is disposed on the other end of the housing 270. The guide shaft 271 guides movement of the image sensor unit 220. As illustrated in FIG. 11, a guide holder 241 which is movably interlinked with the shaft guide 271 is formed on the supporting unit 240. The guide shaft 271 enables the image sensor unit 220 to move stably. In addition, the image sensor unit 220 may move between the scanning position 41 and the calibration position 42 while contacting the transparent plate 230 by elastic element 245.

The housing 270 houses the image sensor unit 220, the supporting unit 240, and the movement unit 260 and the housing cover 210 may be coupled to the housing 270 to seal the inside of the housing 270. Accordingly, the image sensor unit 220 in the housing 270 may be prevented from being contaminated. It is desirable to manufacture the second document scanning apparatus 200 in a clean room so as to prevent contaminants from entering into the inside of the housing 270.

Herein, it should be noted that the second document scanning apparatus 200 is modularized and may be detachably mounted on the ADF 10. That is, both the image sensor unit 220 and the movement unit 260 moving the image sensor unit 220 are built in the housing 270. Accordingly, if the image sensor unit 220 wears it out or the image sensor unit 220 and the movement unit 260 are out of order, a user may easily replace the existing second document scanning apparatus 200 with a new document scanning apparatus. For example, a user may open an ADF cover 16 and replace the second document scanning apparatus 200 easily as illustrated in FIG. 5.

Figure 12:
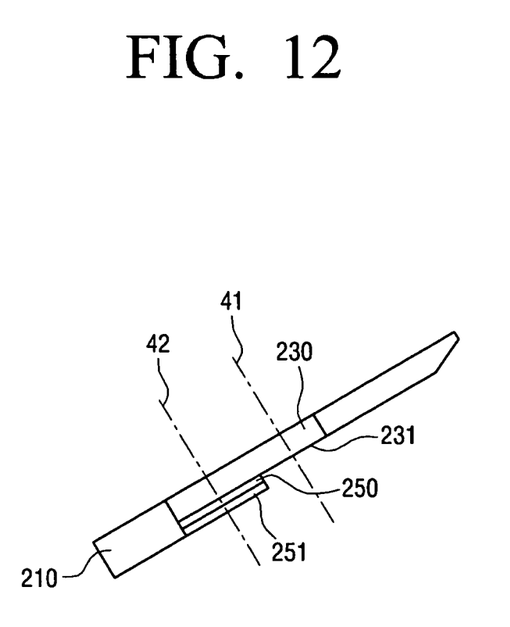
FIGS. 12 and 13 are schematic views illustrating various embodiments.
Figure 13:
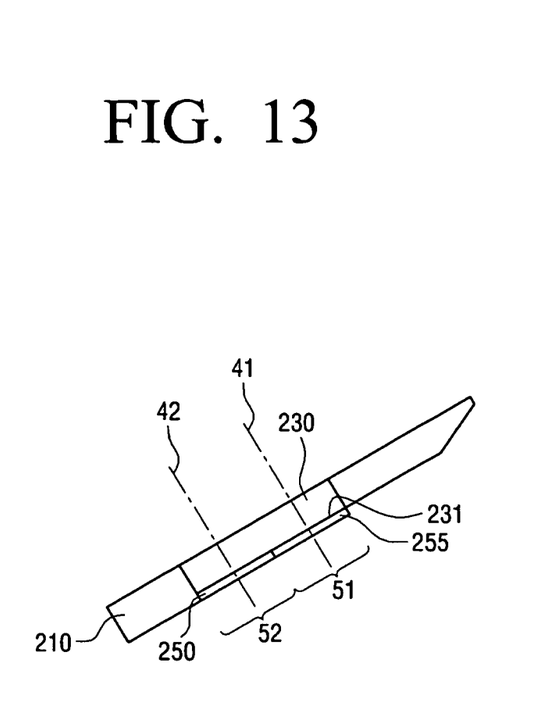

FIGS. 12 and 13 are schematic views illustrating various embodiments. The components which perform the same functions as in the first exemplary embodiment above will be given the same reference numerals and detailed description regarding them will not be provided.

In an embodiment illustrated in FIG. 12, a protection film 251 is attached on the calibration sheet 250. The protection film 251 protects the calibration sheet 250. In order to reduce friction applied to a document transferring along the transfer path 30, it is desirable that a coefficient of friction of the protection film 251 is lower than a coefficient of friction of the calibration sheet 250. In this case, the document may be transferred along the transfer path 30 more smoothly.

In an exemplary embodiment illustrated in FIG. 13, a transparent sheet 255 is attached to a surface of the transparent plate 230, which is exposed to outside. That is, the transparent sheet 255 is disposed in a first area 51 including the scanning position 41, and the calibration sheet 250 is disposed in a second area 52 including the calibration position 42. In FIG. 13, the calibration sheet 250 is disposed in upstream of the transparent sheet 255, but the calibration sheet 250 may be disposed in downstream of the transparent sheet 255 if the calibration position changes. In addition, as illustrated in FIG. 12, the protection film 251 may be attached on the calibration sheet 250.

In an embodiment illustrated in FIG. 13, the thickness of the calibration sheet 250 is the same as the thickness of the transparent sheet 255, but the thickness of the calibration sheet 250 may be different from the thickness of the transparent sheet 255 in another embodiment. However, it is desirable that the thickness of a sheet disposed upstream with reference to a transfer direction of a document is thicker than the thickness of a sheet disposed downstream with reference to a transfer direction of the document in order not to disturb transfer of the document. For example, it is desirable that the thickness of the calibration sheet 250 is thicker than the thickness of the transparent sheet 255 in FIG. 13 since the calibration sheet 250 is disposed in upstream of the transparent sheet 255 with reference to a transfer direction of a document.

Although a few embodiments have been shown and described, it would be appreciated by those skilled in the art that changes may be made to these embodiments without departing from the principles and spirit of the disclosure, the scope of which is defined in the claims and their equivalents.

What is claimed is:

1. A document scanning apparatus for scanning a document, the apparatus comprising:
   an image sensor unit which irradiates an incident light towards the document and generates image data by sensing a reflected light reflected from the document;
   a supporting unit which supports the image sensor unit;
   a movement unit which moves the image sensor unit between a scanning position and a calibration position;
   a housing which houses the image sensor unit, the supporting unit, and the movement unit, wherein the movement unit moves the image sensor unit between a scanning position and a calibration position without moving the housing, and wherein the scanning position is different from the calibration position;
   a transparent plate which transmits the incident light and the reflected light;

a calibration sheet which is attached to a surface of the transparent plate which is exposed to outside, the calibration sheet being positioned in an area including the calibration position; and a housing cover which is coupled to the housing and seals inside of the housing, wherein the document scanning apparatus is configured to be positioned in an automatic document feeder.

2. The apparatus as claimed in claim 1, wherein the image sensor unit moves between the scanning position and the calibration position while contacting the transparent plate.

3. The apparatus as claimed in claim 2, further comprising:
an elastic element which presses the image sensor unit towards the transparent plate.

4. The apparatus as claimed in claim 3, wherein the elastic element includes at least one spring one end of which is connected to the supporting unit and the other end of which is connected to the image sensor unit.

5. The apparatus as claimed in claim 1, wherein the transparent plate is formed on the housing cover.

6. The apparatus as claimed in claim 1, wherein the movement unit comprises:
a motor which provides driving power; and
a power transmission apparatus which transmits driving power provided by the motor to the supporting unit which supports the image sensor unit.

7. The apparatus as claimed in claim 6, wherein the power transmission apparatus comprises:
a worm which is formed on a rotation axis of the motor;
a worm wheel which is interlinked with the worm; and
a rack which is interlinked with the worm wheel and is formed on the supporting unit.

8. The apparatus as claimed in claim 6, wherein:
the housing includes a guide shaft for guiding movement of the image sensor unit, and
the supporting unit includes a guide holder movably interlinked with the guide shaft.

9. The apparatus as claimed in claim 8, wherein the motor is disposed on one end of the housing and the guide shaft is disposed on the other end of the housing.

10. The apparatus as claimed in claim 1, further comprising:
a transparent sheet which is attached on the surface of the transparent plate and is positioned in an area including the scanning position.

11. The apparatus as claimed in claim 10, wherein a thickness of the calibration sheet is the same as a thickness of the transparent sheet.

12. The apparatus as claimed in claim 10, wherein:
the calibration sheet is disposed in upstream of the transparent sheet with reference to a transfer direction of the document, and
a thickness of the calibration sheet is thicker than a thickness of the transparent sheet.

13. The apparatus as claimed in claim 10, wherein:
the transparent sheet is disposed in upstream of the calibration sheet with reference to a transfer direction of the document, and
a thickness of the transparent sheet is thicker than a thickness of the calibration sheet.

14. The apparatus as claimed in claim 1, further comprising:
a protection film which is attached on the calibration sheet to protect the calibration sheet.

15. The apparatus as claimed in claim 14, wherein a coefficient of friction of the protection film is lower than a coefficient of friction of the calibration sheet.

16. An image forming apparatus, wherein:
the automatic document feeder (ADF) transfers the document along a transfer path; and
the image forming apparatus comprises:
a first document scanning apparatus which scans one side of the document being transferred along the transfer path; and
a second document scanning apparatus according to the document scanning apparatus of claim 1 which scans the other side of the document being transferred along the transfer path; and
an image forming unit which forms an image on a printing medium according to image data received from the first and the second document scanning apparatuses.

17. The apparatus as claimed in claim 16, wherein the second document scanning apparatus is detachably mounted on the ADF.

18. The apparatus as claimed in claim 1, wherein the image sensor unit and the supporting unit are integrally formed.

19. The apparatus as claimed in claim 1, wherein a roller is disposed in a location adjacent to the transparent plate so that the document contacts the transparent plate.

20. The apparatus as recited in claim 1, wherein the scanning position is along a first line perpendicular to the transparent plate and the calibration position is along another line perpendicular to the transparent plate, and wherein the first line and the second line are in parallel.

* * * * *